United States Patent [19]

Branson

[11] 4,310,047
[45] Jan. 12, 1982

[54] TEMPERATURE CONTROLLER
[75] Inventor: John Branson, Cambridge, England
[73] Assignee: PYE (Electronic Products) Limited, Cambridge, England
[21] Appl. No.: 112,042
[22] Filed: Jan. 14, 1980
[30] Foreign Application Priority Data
  Jan. 15, 1979 [GB] United Kingdom ............... 01410/79
[51] Int. Cl.³ ........................ F25B 29/00; F25B 21/02
[52] U.S. Cl. .............................................. 165/64; 62/3
[58] Field of Search ................... 62/3; 165/64, 48, 30
[56] References Cited
  U.S. PATENT DOCUMENTS
  3,264,746  8/1966 Pearse ................................... 62/3 X
  3,858,106 12/1974 Launius ................................ 62/3 X
  4,066,365  1/1978 Staunton .............................. 62/3 X
  4,107,934  8/1978 Beitner ................................... 62/3

Primary Examiner—Lloyd L. King
Attorney, Agent, or Firm—Thomas A. Briody; William J. Streeter; Rolf E. Schneider

[57] ABSTRACT

A device for maintaining the temperature of a body at a desired value comprises a thermo-electric heat pump sandwiched between a thermally conductive member and a heat sink. The heat sink is maintained at a substantially constant temperature above the ambient temperature by an electrical heating element. This arrangement reduces the effect of changes in ambient temperature and enables the heat pump to work across a substantially constant temperature differential.

6 Claims, 7 Drawing Figures

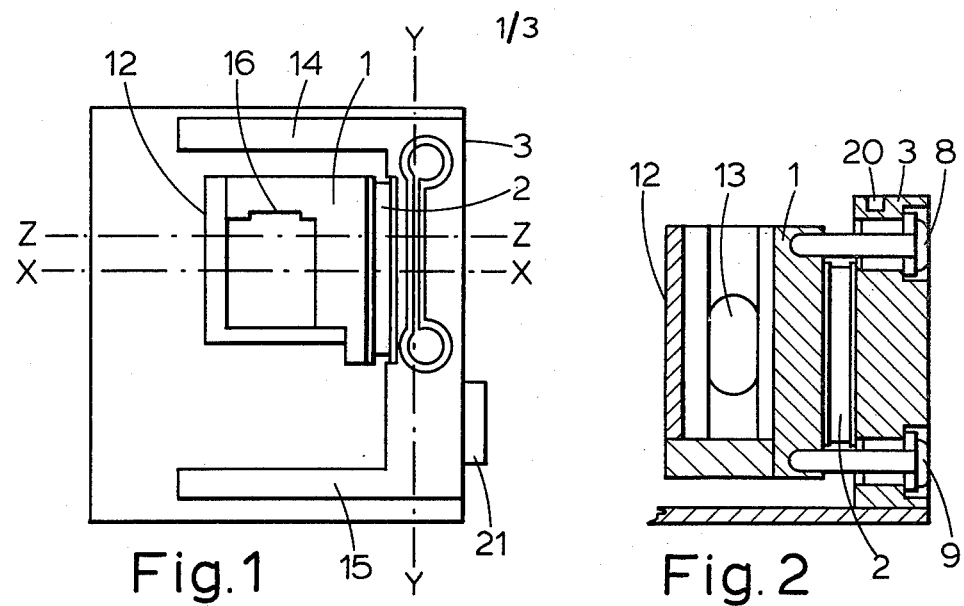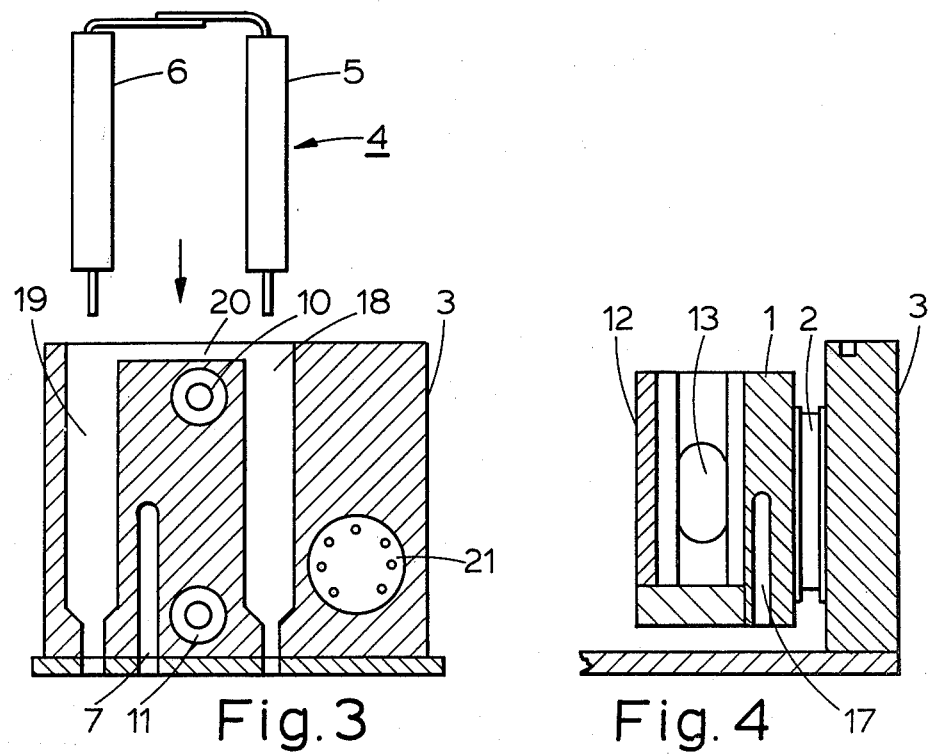

TEMPERATURE CONTROLLER

This invention relates to a device for maintaining the temperature of an object at a desired value comprising a thermally conductive member whose temperature is maintained at a substantially constant value by a thermoelectric heat pump sandwiched between the thermally conductive member and a heat sink.

Such a device for maintaining the temperature of cuvettes used to hold samples for spectrophotometric analysis at a constant desired value has been offered for sale by Gilford Instrument Laboratories Inc. under the trade name "Thermoset". However this device requires the use of cooling water to remove heat from the heat sink when operating below ambient temperatures. This adds to the complexity and the cost of the device.

It is the object of the present invention to provide a device for maintaining the temperature of an object at a desired value in which the use of a cooling liquid is not required and in which the effect of variations in ambient temperature is reduced. The invention provides a device for maintaining the temperature of an object at a desired value comprising a thermally conductive member whose temperature is maintained at a substantially constant value by a thermo-electric heat pump sandwiched between the thermally conductive member and a heat sink characterised in that the heat sink is maintained at a substantially constant temperature which is above the ambient temperature by means of an electrical heating element in thermal contact therewith.

This arrangement reduces the effect of changes in the ambient temperature on the temperature of the thermally conductive member and hence the object whose temperature is to be controlled.

The temperature of the heat sink may be sensed by a first sensor which is connected in a first control circuit which controls the current flowing through the heating element and the temperature of the thermally conductive member may be sensed by a second sensor which is connected in a second control circuit which controls the current flowing through the heat pump. The first mentioned and/or the second sensors may be thermistors.

The thermally conductive member may comprise an enclosure in which the object is located and when the object is a cuvette for holding samples for spectrophotometric analysis may serve to locate the cuvette in the radiation path between a radiation source and a detector. In such an application it is, of course, necessary to provide a radiation transparent path through the device, the cuvette being located in that path.

To reduce still further the effect of changes in the ambient temperature on the temperature of the object the heat sink may form part of a further enclosure which surrounds the thermally conductive member and the object.

The invention will now be described with reference to the accompanying drawings, in which:

FIG. 1 shows a plan view of a device according to the invention,

FIG. 2 shows a partial cross-sectional elevation on line X—X of FIG. 1,

FIG. 3 shows a cross-sectional elevation on line Y—Y of FIG. 1,

FIG. 4 shows a partial cross-sectional elevation on line Z—Z of FIG. 1,

Figure 5:
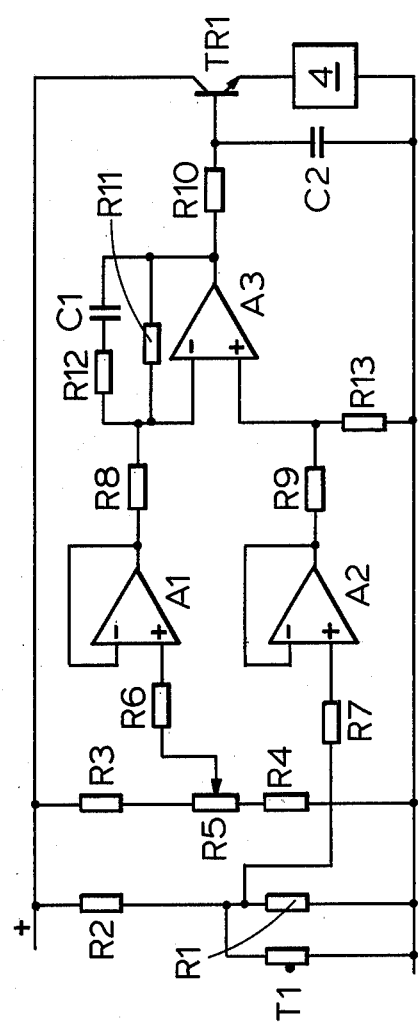
FIG. 5 shows a control circuit for maintaining the temperature of the heat sink at a desired value.

As shown in FIGS. 1 to 4 a device for maintaining the temperature of an object at a desired value comprises a thermally conductive member 1 whose temperature is maintained at a substantially constant value by a thermo-electric heat pump 2 which is sandwiched between the thermally conductive member 1 and a heat sink 3. The thermoelectric heat pump comprises an assembly of junctions between different metals which exhibit the Peltier effect i.e. heat is liberated or absorbed at the junction when a current is passed from one metal to the other. Such a unit is made up of a series of such junctions connected together with the junctions arranged so that heat absorbing junctions are formed on one face of the unit and heat emitting junctions are formed on the other face. Clearly the type of junction will depend on the direction of current flow and thus the unit may be used to pass heat to or extract heat from a body in contact with one or the other face by choosing the direction of current flow.

The heat sink 3 contains an electrical heating element 4 which comprises two high wattage resistors 5 and 6 connected in series. The resistors 5 and 6 fit in pockets 18 and 19 in the heat sink 3 with their common leads located in a groove 20 joining the pockets 18 and 19. The heating element 4 is powered via a control loop which includes a temperature sensing thermistor which is located within the heat sink 3 in a pocket 7. The control circuit or loop is set to provide sufficient current through the heating element 4 to cause the heat sink to be maintained at a selected temperature which is sufficiently above the ambient temperature that added heat is required above that dissipated by the heat pump 2.

The thermally conductive member 1 is connected to the heat sink 3 by bolts 8 and 9 which pass through thermally insulating bushes 10 and 11 in the heat sink 3 and together with an L-shaped member 12 forms an enclosure in which a cuvette containing a sample for analysis may be placed. As can be seen from FIGS. 2 and 4 the thermally conductive member 1 is provided with an aperture 13 through which a radiation beam may pass. The L-shaped member 12 has a similarly shaped aperture aligned with the aperture 13 so that a beam of radiation may pass through the cuvette when the device is placed between the radiation source and the detector of a spectrophotometer. Corresponding aligned apertures are also provided in the wing portions 14 and 15 of the heat sink 3. The thermally conductive member 1 is provided with a groove 16 for locating the cuvette within the device and a pocket 17 in which a second thermistor, which is in a control loop for feeding current to the heat pump 2, is located.

The arrangement of the heated heat sink 3 which is kept at a nominally constant temperature which is above the ambient temperature enables the heat pump 2 to maintain the temperature of the thermally conductive member 1 more closely to the desired value during changes of the ambient temperature.

An electrical connector 21 is attached to the heat sink 3 and the thermistors and the heating element are terminated on the connector to enable connection to the control circuitry which is located in a separate unit.

Figure 6:
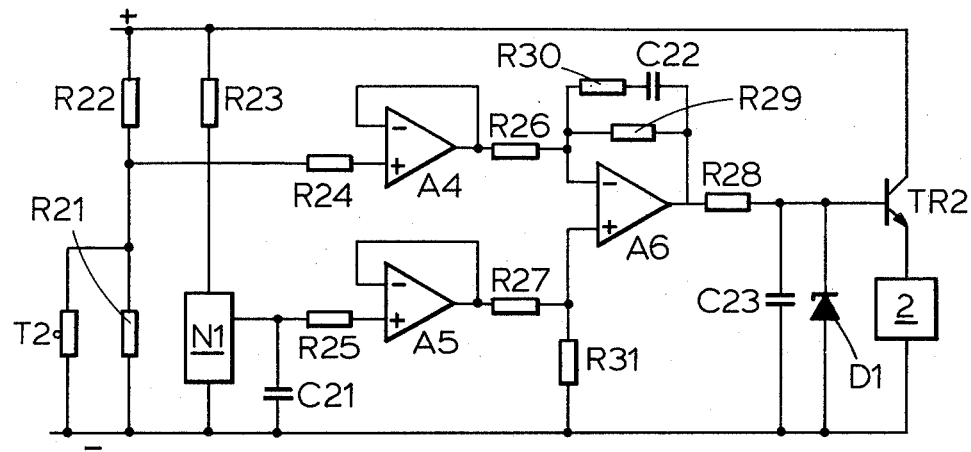
FIG. 6 shows a control circuit for controlling the heat pump.
Figure 7:
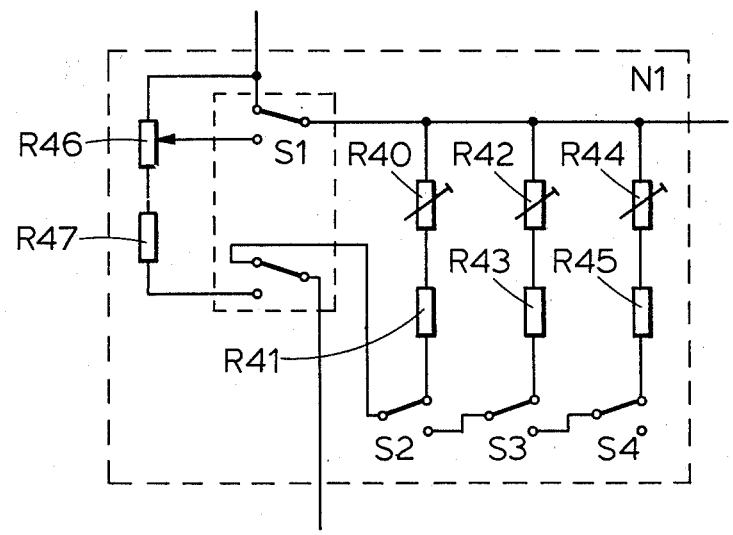
FIG. 7 shows the temperature selection circuit of FIG. 6 in greater detail.

FIGS. 5, 6 and 7 show the control circuitry used to drive the heating element 4 and the heat pump 2 in response to signals derived from temperature sensors in the heat sink 3 and the thermally conductive member 1. The drive circuit for the heating element 4 is shown in FIG. 5 and includes a thermistor T1 which is connected in parallel with a resistor R1 as a first arm of a bridge network. A resistor R2 forms the second arm of the bridge circuit while resistors R3 and R4 and a potentiometer R5 form the third and fourth arms of the bridge. The wiper of potentiometer R5 which forms the junction of the third and fourth arms of the bridge is connected via a resistor R6 to the input of a buffler amplifier A1. The junction of the first and second arms of the bridge is connected via a resistor R7 to the input of a further buffer amplifier A2. Buffer amplifiers A1 and A2 comprise operational amplifiers having their outputs connected to their negative (or inverting) inputs. The output of amplifier A1 is connected via a resistor R8 to the negative input of amplifier A3 while the output of amplifier A2 is connected via a resistor R9 to the positive input of amplifier A3. Amplifier A3 is connected to function as a comparator and its output drives an npn transistor TR1 via a resistor R10, the transistor TR1 controlling the current through the heater 4. A feedback network comprising a resistor R11 in parallel with the series arrangement of a resistor R12 and a capacitor C1 is connected between the output amplifier A3 and its negative input while a resistor R13 is connected between the positive input of amplifier A3 and the negative supply rail. A capacitor C2 is connected between the base of transistor TR1 and the negative supply rail.

The thermistor T1 is located in the pocket 7 of the heat sink 3 to sense the temperature of the heat sink and is connected in a bridge circuit which includes potentiometer R5 which is set to balance the bridge when a desired temperature is sensed by the thermistor. If the temperature of the heat sink 3 is below the desired value the bridge will be unbalanced and the amplifier A3 will produce an output signal to turn on transistor TR1 and thus pass current through the heating element 4 until the heat sink reaches the desired temperature. The bridge will then be balanced and the output of amplifier A3 will turn off transistor TR1 and hence the current through the heating element 4 will cease.

FIG. 6 shows the drive circuit for the heat pump 2 which is similar to the drive circuit for the heating element 4 shown in FIG. 5. A thermistor T2 is connected in parallel with a resistor R21 to form the first arm of a bridge circuit the second, third and fourth arms of which are formed by a resistor R22, a resistor R23 and a temperature selection network N1 which is shown in detail in FIG. 7. The junction of the first and second arms of the bridge is connected via a resistor R24 to the input of a buffer amplifier A4 while the junction of the third and fourth arms of the bridge is connected via a resistor R25 to the input of a buffer amplifier A5. A capacitor C21 is connected between resistor R25 and the negative supply rail. The output of amplifier A4 is connected via a resistor R26 to the negative input of an operational amplifier A6 while the output of amplifier A5 is connected via a resistor R27 to the positive input of amplifier A6. Amplifier A6 is connected to act as a comparator and its output drives an npn transistor TR2 via a resistor R28, the transistor TR2 controlling the current through the heat pump 2. A feedback network comprising a resistor R29 in parallel with the series arrangement of a resistor R30 and a capacitor C22 is connected between the output of amplifier A6 and its negative input while a resistor R31 is connected between the positive input of amplifier A6 and the negative supply rail. A capacitor C23 in parallel with a voltage reference diode D1 is connected between the base of transistor TR2 and the negative supply rail.

The network N1 comprises a two pole changeover switch S1 which in the position shown in FIG. 7 connects the series arrangement of a preset potentiometer R40 a resistor R41 and a switch S2 as the fourth arm of the bridge. The bridge then balances when the temperature sensed by the thermistor T2 which is located in pocket 17 of the thermally conductive member 1 reaches a value dependent on the setting of potentiometer R40. Two further switches S3 and S4 may be used to connect a preset potentiometer R42 and a resistor R43 or a preset potentiometer R44 and a resistor R45 as the fourth arm of the bridge. Switches S2, S3 and S4 are connected in a series arrangement so that only one may at any time connect its associated potentiometer and resistor into the bridge at one time.

When switch S1 is in the opposite position it connects the wiper of a potentiometer R46 which is in series with a resistor R47, via resistor R25 to the input of amplifier A5. The wiper potentiometer thus forms the junction of the third and fourth arms of the bridge and the other end of the potentiometer is connected to resistor R23.

The network N1 is provided to enable three preset temperatures to be selected by operation of switches S2, S3 and S4 or a variable temperature to be selected by operation of switch S1 and potentiometer R46. The preset temperatures may be, for example, 25° C., 30° C. and 37° C.

In operation the desired temperature is selected as hereinbefore described and the thermistor T2 senses the temperature of the thermally conductive member 1. When the bridge is unbalanced amplifier A6 produces an output to drive transistor TR2 which in turn controls the current through the heat pump 2 so as to tend to balance the bridge.

As can be seen from the foregoing description there are two control circuits or loops the first controlling the heat sink temperature and the second the temperature of the thermally conductive member 1. This arrangement enables closer control of the temperature of thermally conductive member 1 when the ambient temperature is changing since the first control loop reduces the effect of changing ambient temperatures on the temperature of the heat sink 3 and enables the heat pump 2 to operate with a substantially constant temperature differential across it.

Various modifications may be made to the device without departing from the scope of the claims. For example, the heat sink 3 may be formed as a box structure to enclose the thermally conductive member 1. When the device is not intended to be used for housing samples for analysis by passing radiation therethrough the apertures 13 may be omitted.

I claim:

1. Apparatus for maintaining the temperature of an object at a desired value, which comprises a thermally conductive member for containing the object, a heat sink, a thermo-electric heat pump sandwiched between the thermally conductive member and the heat sink for maintaining the thermally conductive member at a substantially constant temperature, and an electrical resistance heating element in thermal contact with the heat sink to maintain the heat sink at a substantially constant temperature above the ambient temperature.

2. Apparatus according to claim 1, in which the heating element forms part of a first control circuit for controlling the current flowing through the heating element, said first control circuit including a first sensor in contact solely with the heat sink for sensing the temperature of said heat sink.

3. Apparatus according to claim 2, which includes a second control circuit for controlling the current flowing through the thermo-electric heat pump, said second control circuit including a second sensor in contact with the thermally conductive member for sensing the temperature of said thermally coductive member.

4. Apparatus according to claim 2 or 3, in which the first sensor and the second sensor are thermistors.

5. Apparatus according to claim 1, 2 or 3, in which the thermally conductive member comprises an enclosure for the object.

6. Apparatus according to claim 1, 2 or 3, in which the heat sink is formed so as to at least partially surround the thermally conductive member.

* * * * *